(12) United States Patent
Vachon et al.

(10) Patent No.: US 7,597,084 B2
(45) Date of Patent: Oct. 6, 2009

(54) INTERNAL COMBUSTION ENGINE AND OPERATING METHOD THEREFOR

(75) Inventors: John T. Vachon, Peoria, IL (US); Carl-Anders Hergart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 11/731,599

(22) Filed: Mar. 30, 2007

(65) Prior Publication Data

US 2007/0169741 A1   Jul. 26, 2007

Related U.S. Application Data

(63) Continuation-in-part of application No. 11/076,339, filed on Mar. 9, 2005, now Pat. No. 7,201,135.

(51) Int. Cl.
 *F02B 3/00*  (2006.01)
 *F02M 1/00*  (2006.01)

(52) U.S. Cl. ................................. 123/294; 123/434

(58) Field of Classification Search ............ 123/294, 123/305, 434, 429
See application file for complete search history.

(56) References Cited

U.S. PATENT DOCUMENTS

| | | | |
|---|---|---|---|
| 4,161,991 A * | 7/1979 | van der Lely | 180/53.7 |
| 4,207,843 A | 6/1980 | List et al. | |
| 4,857,696 A | 8/1989 | Taeusch et al. | |
| 5,037,031 A | 8/1991 | Campbell et al. | |
| 5,042,721 A | 8/1991 | Muntean et al. | |
| 5,237,148 A | 8/1993 | Aoki et al. | |
| 5,313,924 A * | 5/1994 | Regueiro | 123/456 |
| 5,357,912 A * | 10/1994 | Barnes et al. | 123/357 |
| 5,392,745 A | 2/1995 | Beck | |
| 5,458,292 A | 10/1995 | Hapeman | |
| 6,070,813 A | 6/2000 | Durheim | |
| 6,220,528 B1 | 4/2001 | Cooke et al. | |
| 6,325,040 B1 * | 12/2001 | Tanaka | 123/294 |
| 6,557,779 B2 | 5/2003 | Perr et al. | |
| 6,601,566 B2 | 8/2003 | Gillis et al. | |

(Continued)

FOREIGN PATENT DOCUMENTS

WO   WO 99/47804   9/1999

(Continued)

OTHER PUBLICATIONS

Dr. Schrick Company; Diesel Engine For Unmanned Aircraft, Focus; publication prior to Jan. 1, 2005; p. 30; Remscheid, Germany.

*Primary Examiner*—John T Kwon
(74) *Attorney, Agent, or Firm*—Liell & McNeil

(57) ABSTRACT

The present disclosure provides an engine operating method and high power density internal combustion engine, including an engine housing with a plurality of cylinders. Fuel injectors are provided and disposed at least partially within each cylinder, and configured to inject fuel such as diesel, JP8 or another fuel therein for compression ignition. The engine is configured to burn a quantity of injected fuel to yield at least about 150 horsepower per liter of engine displacement at a smoke output of less than about 0.4 grams, and in some cases less than about 0.75 grams, smoke per horsepower-hour, at a fuel consumption of less than about 250 grams fuel per kilowatt-hour output of the engine.

17 Claims, 7 Drawing Sheets

U.S. PATENT DOCUMENTS

| | | |
|---|---|---|
| 6,769,635 B2 | 8/2004 | Stewart et al. |
| 6,918,377 B2 | 7/2005 | Boltz |
| 6,945,475 B2 | 9/2005 | Lawrence et al. |
| 7,086,377 B2 | 8/2006 | Best |
| 2002/0117146 A1 | 8/2002 | Gatellier et al. |
| 2003/0042326 A1 | 3/2003 | Jameson et al. |
| 2006/0201478 A1 | 9/2006 | Vachon |

FOREIGN PATENT DOCUMENTS

| | | |
|---|---|---|
| WO | WO 2004/057168 | 7/2004 |

* cited by examiner

INTERNAL COMBUSTION ENGINE AND OPERATING METHOD THEREFOR

CROSS-REFERENCE TO RELATED APPLICATIONS

This application is a continuation-in-part of U.S. patent application Ser. No. 11/076,339, filed Mar. 9, 2005 now U.S. Pat. No. 7,201,135.

TECHNICAL FIELD

The present disclosure relates generally to internal combustion engines, and relates more particularly to a high power density direct injection compression ignition engine and engine operating method.

BACKGROUND

Internal combustion engines have long been used as power sources in a broad range of applications. Internal combustion engines may range in size from relatively small, hand held power tools to very large diesel engines used in marine vessels and electrical power stations. In general terms, larger engines are more powerful, whereas smaller engines are less powerful. Engine power can be calculated with the following equation, where "BMEP" is brake mean effective pressure, the average cylinder pressure during the power stroke of a conventional four-stroke piston engine:

$$\text{Power} = (\text{BMEP}) \times (\text{Engine Displacement}) \times (\text{RPM}) \times (1/792{,}000). \text{ (English units)}$$

While larger engines may be more powerful, their power-to-weight or size ratio or "power-density" will be typically less than in smaller engines. Power varies with the square of a given scale factor whereas weight and volume vary with the cube of the scale factor. Scaling engine size up by a factor of two, for example, by doubling the cylinder bore size and doubling the piston stroke of a typical engine will, with everything else being equal, increase power about four times. The size and weight, however, will increase by about eight times. The "power density" may thus decrease by one half. The same principles are generally applicable when attempting to scale down an engine. Where bore size of a typical engine is decreased by a factor of two, engine power will decrease by a factor of four, but size and weight of the engine will decrease by a factor of eight. Thus, while smaller engines will have comparatively less available power output, their theoretical power density will in many cases be greater than similar larger engines.

Another related factor bearing on power density is the stroke distance of pistons in a particular engine. In many engines, there is a trade-off between stroke distance and RPM. Relatively longer stroke engines tend to have more torque and lower RPM, whereas relatively shorter stroke engines tend to have lower torque and greater RPM. Even where a short stroke engine and a long stroke engine have the same horsepower, the shorter stroke engine may have a greater power density since it may be a shorter, smaller engine.

For many applications, smaller, more power dense engines may be desirable. In many aircraft, for example, it is desirable to employ relatively small, lightweight, power dense engines with a relatively large number of cylinders rather than large engines having relatively fewer cylinders. However, attempts to scale down many internal combustion engines below certain limits have met with little success, particularly with regard to direct injection compression ignition engines. Many smaller, theoretically more power dense engines may be incapable of fully burning sufficient fuel per each power stroke in their comparatively small cylinders to meet higher power demands.

For example, if a conventional engine is running at a lower temperature and boost, where relatively small fuel quantities are injected for each cycle, and more power is demanded of the engine, an inability to burn the higher demanded fuel quantities may limit the engine's power output. As more fuel is injected over longer injection times, the liquid fuel spray can contact the piston surfaces and any other combustion chamber surfaces, known in the art as "wall wetting," before it has a chance to adequately mix with the cylinder's fresh charge of air. This problem is particularly acute in smaller bore engines. Wall wetting can thus limit small bore engines to lower power and worse emissions than what intuitively could be their inherent capabilities, as wall wetting tends to cause poor combustion and high hydrocarbon and particulate emissions.

At relatively higher temperatures and in-cylinder pressures, wall wetting is less of a problem. Inadequate mixing of the fuel and air, however, can cause excessive smoke before combustion, limiting the engine's power long before its theoretical power limit is reached. One reason for these limitations is that at higher RPMs, there is only a relatively small amount of time within which to inject and ignite fuel in each cylinder. Higher speed compression ignition engines tend to experience this problem regardless of engine size.

As a result of the above limitations, two very general classes of small diesel engines have arisen, those that operate at relatively higher BMEP and lower RPM, and those that operate at relatively lower BMEP and higher RPM. However, neither type of engine is typically capable of providing an attractive power density commensurate with their size and weight. In general, conventional larger bore engines also are typically operated at either high BMEP and low RPM, medium BMEP and medium RPM, or low BMEP and high RPM, but not both high BMEP and high RPM, where attempts to maximize power density are made.

One example of a small bore diesel engine is the TKDI 600, designed by the Dr. Schrick company of Remscheid, Germany. The TKDI 600 claims a 34 KW output at 6000 RPM, or about 46 hp. The bore size of the TKDI 600 may be about 76 mm or about 3 inches, and the piston stroke may be about 66 mm or 2.6 inches. Although the TKDI 600 is claimed to have certain applications, such as in a small unmanned aircraft, the available BMEP is relatively low, about 169 PSI and the engine is therefore somewhat limited in its total available power output and hence, power density.

The present disclosure is directed to one or more of the problems or shortcomings set forth above.

SUMMARY OF THE DISCLOSURE

In one aspect, the present disclosure provides an internal combustion engine that includes an engine housing having a plurality of cylinders each with a piston positioned at least partially therein. The pistons are each movable a stroke distance to increase a pressure of the corresponding cylinder to a pressure sufficient for compression ignition of fuel. A diameter of the cylinders and a length of the stroke distance defines a displacement of the internal combustion engine. The engine further includes a crankshaft coupled with each of the pistons and rotatable via combustion of fuel in each of the cylinders and a plurality of fuel injectors having fixed positions relative to the engine housing. At least one injector extends into each of the cylinders and is configured to inject a liquid fuel therein at an injection pressure via a plurality of outlet orifices. The engine is further configured to burn a quantity of injected fuel in each of the cylinders to yield at least about 150 horsepower per liter of engine displacement at a smoke output of less than about 0.4 grams smoke per horsepower-hour and a fuel consumption of less than about 250 grams fuel per kilowatt-hour output of the engine.

In another aspect, the present disclosure provides a method of operating an internal combustion engine, including a step of rotating an engine crankshaft via a plurality of pistons, each reciprocable a stroke distance within an engine cylinder and configured to increase a pressure therein to a pressure sufficient for compression ignition of fuel. The method further includes a step of injecting a liquid fuel into each of the cylinders via fuel injectors extending into each of the cylinders and having a plurality of outlet orifices. The method still further includes a step of burning fuel injected into each of the cylinders to yield at least about 150 horsepower per liter of engine displacement at a smoke output of less than about 0.4 grams smoke per horsepower-hour and a fuel consumption of less than about 250 grams fuel per kilowatt-hour output of the engine.

DETAILED DESCRIPTION

Figure 1:
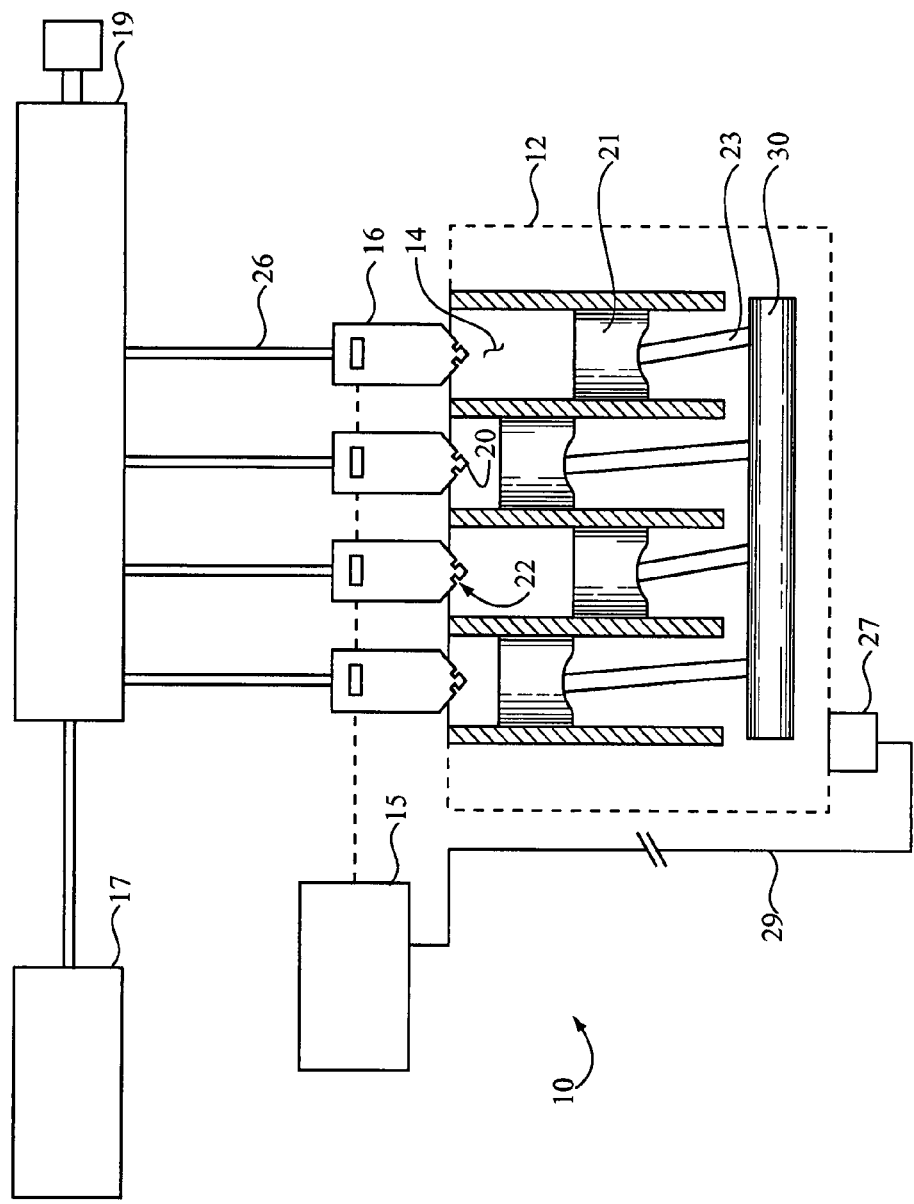
FIG. 1 is a schematic illustration of an engine according to the present disclosure.

Referring to FIG. 1, there is shown a schematic illustration of an engine 10 according to one embodiment of the present disclosure. Engine 10 includes an engine housing 12 having a plurality of cylinders 14 therein. Fuel injectors 16 are disposed at fixed locations relative to housing 12, extend at least partially into each of cylinders 14 and are operable to direct inject a liquid fuel therein. Each of fuel injectors 16 may include a fuel injector tip 20 extending into the associated cylinder, each tip 20 having a plurality of outlet orifices 22. Engine 10 further includes a plurality of pistons 21, each disposed at least partially within one of cylinders 14 and movable therein to increase cylinder pressures to a pressure sufficient for compression ignition of fuel. The compression ratio may be up to about 15.5 to 1 in certain embodiments. Each piston is coupled with a crankshaft 30 via a piston rod 23 to enable rotation of crankshaft 30 via combustion of fuel in cylinders 14. Engine 10 may further include a pressurized fuel source 17, which may include a high pressure pump or cam-actuated fuel pressurizer, for example. Pressurized fuel source 17 may be fluidly connected with each of fuel injectors 16 via a high pressure feed line or common rail 19 and a plurality of supply passages 26. It is contemplated that source 17 will pressurize fuel to at least about 150 MPa, although the present disclosure is not thereby limited. Relatively higher pressures have in some instances been shown to facilitate atomization of injected fuel, however, the actual pressure may be selected based upon various desired operating characteristics of the particular engine, and feasibility. It is contemplated that engine 10 may be a compression ignition engine, for example a diesel engine. Engine 10, or any of the other engines contemplated herein, may also include at least one sensor 27 configured to sense values indicative of engine speed and/or engine load, and output corresponding signals to an electronic controller 15.

As will be apparent from the following description, the present disclosure provides engine design and operating strategies enabling substantially greater engine power density than traditional compression ignition engines. In certain embodiments, described herein, relatively small engines having higher power densities than other known engines are possible. In other embodiments, conventional sized compression ignition engines, for example, having cylinder bore sizes of about 4.5 inches or greater, are provided which have power densities well above those associated with other conventional compression ignition engines. Regardless of engine size, the present disclosure provides engines and engine operating strategies which move compression ignition engine technology into a new realm of power density, without compromising on efficiency and smoke emissions. The smoke output levels stated herein are achieved without use of particulate filters, though in some applications oxidation catalysts might be used. Thus, in view of the various teachings set forth herein, those skilled in the art will appreciate that a wide variety of highly power dense compression ignition engines may be designed according to the present disclosure, having a broad range of sizes and weights.

Figure 7:
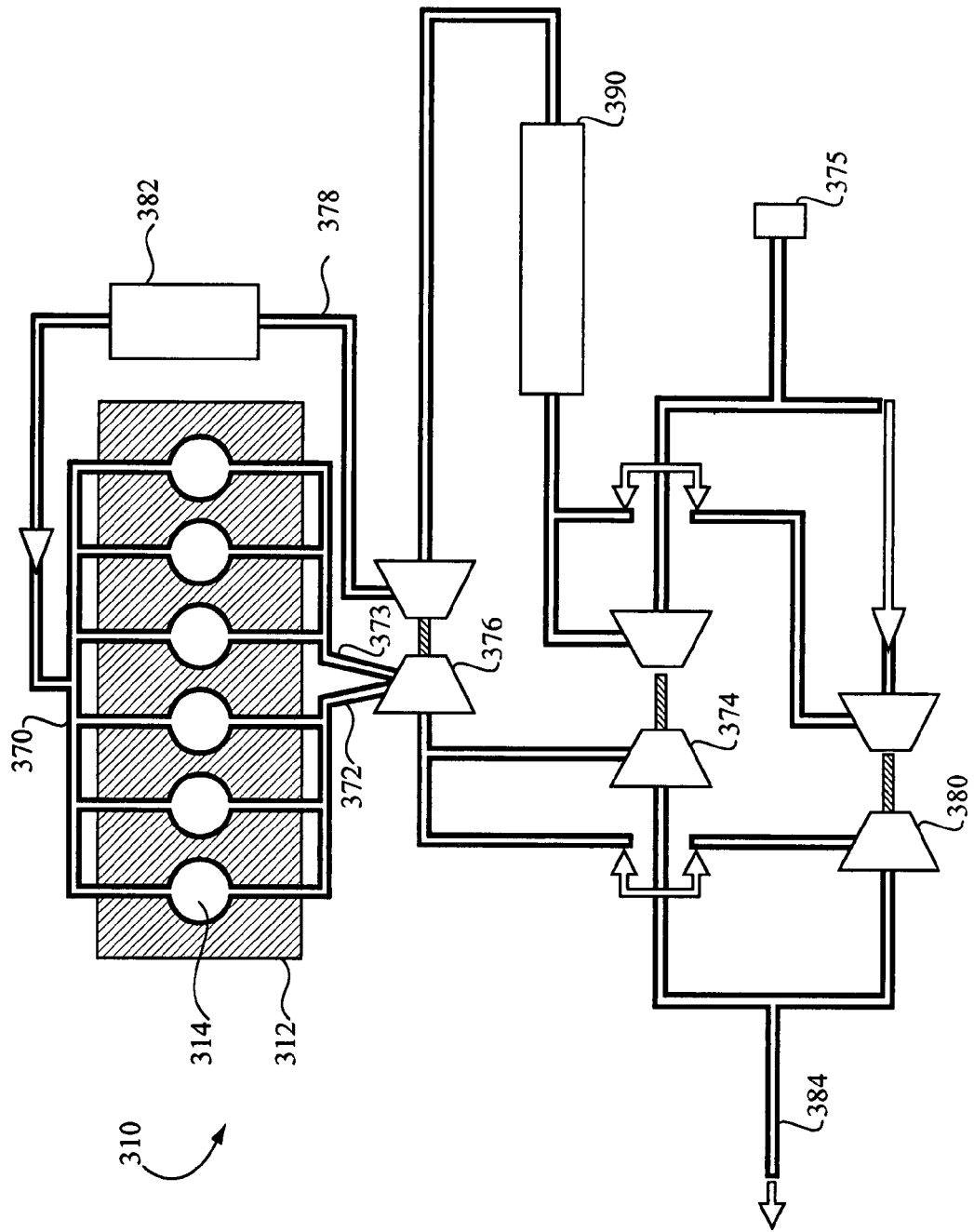
FIG. 7 is a schematic illustration of an engine according to the present disclosure.

Engines contemplated herein may further include a specific turbocharger configuration to provide relatively high boost pressures, which by providing a relatively high Air/Fuel ratio enables a substantial reduction in smoke over earlier strategies, as further described herein. Referring to FIG. 7, there is shown an engine 310 similar to engine 10, and thus shown with corresponding reference numerals, but also including the particular turbocharger design mentioned above. Engine 310 may include a housing 312 having a plurality of cylinders 314. In particular, engine 310 may also include one or more exhaust passages extending from engine housing 312, for example dual exhaust passages 372 and 373. Each of exhaust passages 372 and 373 may supply exhaust gas to a high pressure turbocharger 376. An air inlet 375 may supply air for pressurization by turbocharger 376, and the other turbochargers described herein. After powering turbocharger 376, exhaust gases may flow in parallel to two low pressure turbochargers 374 and 380. After passing through turbochargers 374 and 380, exhaust gases may exit via an exhaust outlet passage 384. Air from inlet 375 may be pressurized via turbocharger 374 and turbocharger 380, then pass to turbocharger 376 for another pressurization stage. An intercooler 390 may be used between the respective pressurization stages. Pressurized air is then supplied to an intake manifold 370 after passing through an aftercooler 382. In one embodiment, turbochargers 374, 376 and 380 will be configured to supply pressurized air to cylinders 314 at a boost pressure ratio of between about 4 to 1 and about 7 to 1, in some embodiments between about 5 to 1 and about 6 to 1. This relatively high boost pressure can further facilitate operation at relatively high air to fuel ratios. In one embodiment, the air to fuel ratio in cylinders 314 may be at least about 25 to 1.

Turbocharger 376 may be positioned in series with turbochargers 374 and 380, although other configurations are possible.

Figure 2:
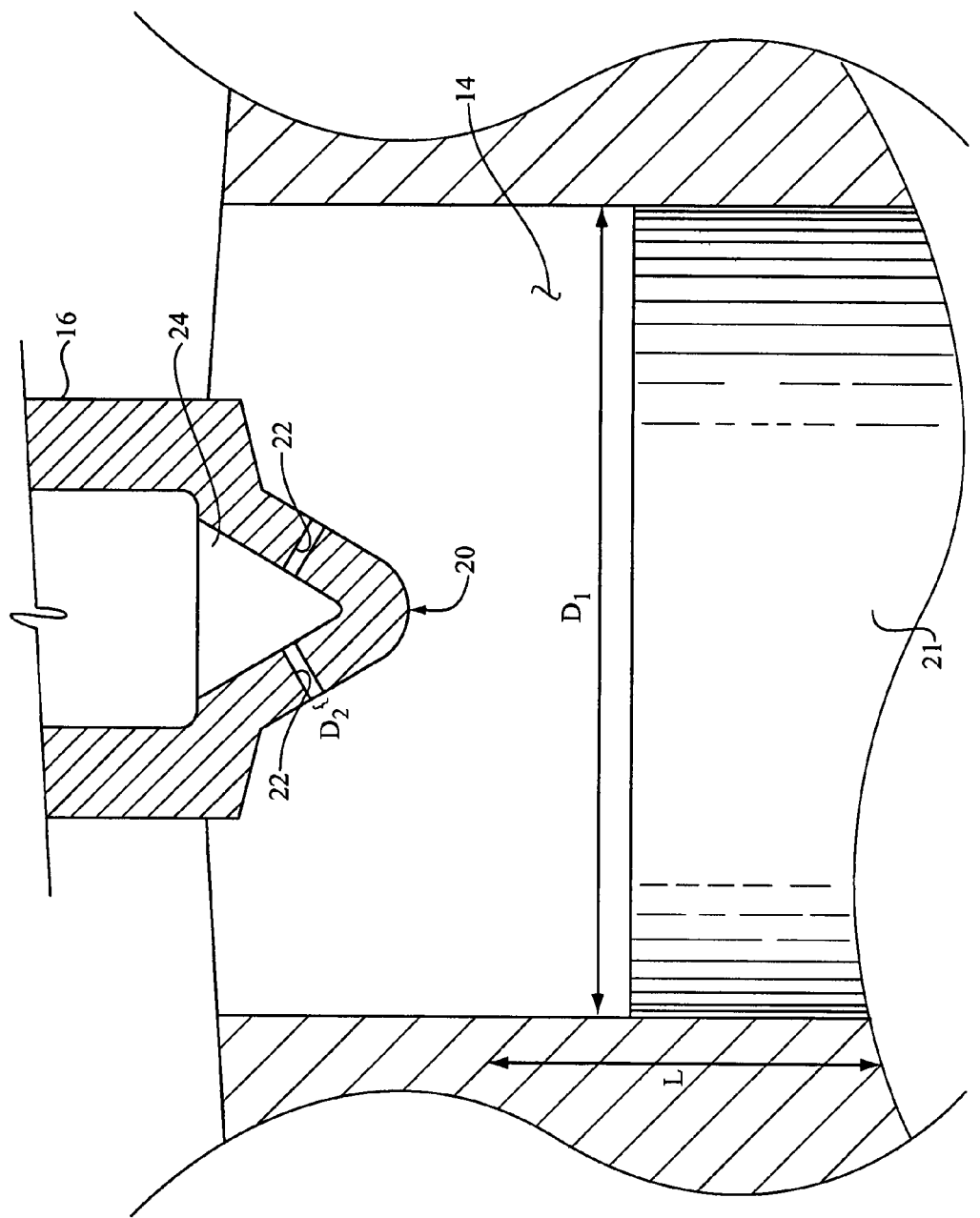
FIG. 2 is an enlarged partially sectioned side diagrammatic view of a portion of an engine cylinder that includes a fuel injector, according to the present disclosure.

Referring now to FIG. 2, there is shown a close-up view of a portion of engine 10 of FIG. 1, including a cylinder 14 with a piston 21 movably positioned therein. Each cylinder 14 of engine 10 may have a diameter $D_1$, that is less than about 3 inches, and may be between about 2 inches and about 3 inches. About 3 means between 2.5 and 3.5. About 2.5 means between 2.45 and 2.55. These examples will allow one to determine precisely what is meant by the phrase about X, in the context of the present disclosure. In certain embodiments, $D_1$ will be between about 2.5 and about 2.8 inches, and may also be about 2.7 inches in one practical embodiment. Although it is contemplated that engine 10 might be constructed having only a single cylinder and single piston, most embodiments will include a plurality of cylinders and pistons, typically at least eight, and embodiments are contemplated wherein engine 10 includes 12 cylinders, or even up to 16 or more cylinders depending upon the application. The arrangement of cylinders in engine 10 may comprise any known configuration, such as a V-pattern, in-line, radial, opposed, etc. In many embodiments, size and space will be at a premium and thus a V-pattern engine, for example, may be a practical design.

Engine 10 may be either of a two-stroke or four-stroke engine, although it is contemplated that a four-stroke cycle will be a practical implementation strategy. To this end, fuel will be injected via fuel injectors 16 at least about once every fourth piston stroke. Each piston 21 will typically have a stroke distance "L" that is between about 2 inches and about 3 inches, and embodiments are contemplated wherein the stroke distance of each piston 21 will be about 2.5 inches. Given the typical stroke distance of each piston 21, the total displacement of each cylinder 14 of engine 10 in some embodiments may be less than about 25 cubic inches and may be between about 6 cubic inches and about 25 cubic inches. Where larger cylinder bore sizes are used, the respective cylinder displacements may be relatively larger. Embodiments are also contemplated wherein the total displacement of each cylinder 14 will be between about 7 cubic inches and about 25 cubic inches, and may be about 14 cubic inches, for example.

Other embodiments may have relatively larger bore sizes, and may further have oversquare bore to stroke ratios. In some contemplated engines, a ratio of cylinder diameter to stroke distance may be in the range of about 1.3 to 1 to about 1.6 to 1. Stroke distance in such embodiments may be about 3.25 inches or less, for example, whereas cylinder bore size may be about 4.5 inches or greater. Using a relatively short stroke distance in a given engine can enable operation at relatively higher RPM without increasing piston speeds. In other words, two different engines may have the same displacement and the same or a similar maximum practicable piston speed, due to thermal loading, tribology issues, etc. However, where one of the engines has a relatively shorter stroke distance, it may operate at relatively higher RPM than an engine with greater stroke distance whilst still operating at the same piston speed. Piston speed limits and thermal loading are factors which can limit power density of a given engine by limiting RPM. Thus, to achieve the highest power density for a given piston speed, relatively shorter piston strokes may be desirable. In addition, a ratio of thermal loading to stroke distance is proportional to power density; hence, shorter piston stroke distance also may be desirable to attain maximum power density at a given thermal loading of an engine. Shorter stroke engines also tend to be smaller for a given engine displacement and accordingly have relatively lower thermal loading and tend to be easier to cool given the typically thinner metal sections of the engine housing. It will thus be readily apparent that short piston strokes are desirable for achieving higher power density for a variety of reasons, but are not necessarily required in the context of the present disclosure.

At least a portion of outlet orifices 22 of each fuel injector 16 may be between about 50 microns and about 125 microns in diameter, $D_2$ in FIG. 2. References herein to microns should be understood as corresponding to metric units, thus 50 microns equals 0.05 millimeters, 60 microns equals 0.06 millimeters, 85 microns equals 0.085 millimeters, 90 microns equals 0.09 millimeters, 110 microns equals 0.1 millimeters, and 125 microns equals 0.125 millimeters. In certain embodiments, some or all of orifices 22 will be between about 0.06 millimeters and about 0.09 millimeters and some or all may be about 0.085 millimeters. Orifices 22 may be formed by laser drilling holes in injector tip 20 connecting an exterior of injector tip 20 with a nozzle chamber 24 of each fuel injector 16. One suitable laser drilling process is taught in commonly owned U.S. Pat. No. 6,070,813 to Durheim. Although it is contemplated that laser drilling of orifices 22 will be a workable strategy, other methods of forming ultra small injector orifices may be used. For instance, orifices 22 may be formed via known methods of coating or plating larger holes down to the desired diameter, or casting ceramic injector nozzles with small wires therein, and burning the wires away during curing of the nozzles, or any other currently known or to be discovered injector orifice making technique. In other engine designs, orifice size may be relatively larger, however.

The number of orifices 22 may vary, in most embodiments the ultra-small orifices of orifices 22 will number greater than about 7 and typically between about 10 and about 30. Flow area will vary with the square of a scale factor in orifice diameter. Thus, designing an engine having fuel injector orifices with approximately one half the diameter of conventional, 160 micron orifices, for example, will yield a flow area per each 80 micron orifice that is ¼ that of a 160 micron orifice. Thus, in this example, at least 4 smaller holes are necessary to equal the flow area capability of one larger orifice.

It is contemplated that orifices 22 may have a variety of shapes. Conventional fuel outlet orifices are generally cylindrical, however, recent advances in orifice forming techniques have opened the door to the use of more complex shapes, tailored specifically to certain applications. Thus, in some embodiments, orifices 22 might be tapered, trumpet-shaped, oval in cross section, or still some other shape. It is contemplated, however, that orifices 22 will in most embodiments have an average minimum cross sectional flow area that is between about 0.002 square millimeters and about 0.01 square millimeters. Thus, those skilled in the art will appreciate that many different orifice configurations, number, size, pattern, etc. may be implemented in a fuel injector and/or engine which will fall within the scope of the present disclosure.

Depth of penetration of the fuel spray will be generally linearly related with orifice size. The likelihood and degree of wall wetting and spraying of the injected fuel onto a piston face in a given cylinder will typically be related to depth of penetration of the fuel spray. Accordingly, because smaller cylinder bores tend to experience wall wetting more easily than larger bores, it may be generally desirable to utilize relatively smaller orifices with relatively smaller cylinder bore sizes. For example, in an embodiment wherein $D_1$ is relatively closer to 2 inches, orifices having a diameter $D_2$, relatively closer to 0.05 millimeters may be appropriate. The converse may be applicable to larger size cylinders, e.g. closer to 3 inches and having fuel injector orifices closer to 0.125 millimeters.

In one specific example, it is contemplated that engine 10 will utilize a fuel system capable of delivering a fuel injection pressure of at least about 150 MPa, and in some instances at least about 240 MPa. Increased fuel injection pressures have been found to enhance mixing of the fuel and air without unduly affecting the depth of penetration of atomized fuel into the cylinder. Fuel flow rate scales with the square root of the scale factor, thus doubling injection pressure will yield an increase in flow rate for a given orifice size that is about $\sqrt{2}$ times the original flow rate. Increased injection pressure also has a positive impact on air entrainment, which is relevant to soot formation and oxidation processes. Similar to flow rate, the air entrainment scales with the square root of the injection pressure.

The present disclosure further provides a method of operating an internal combustion engine. The method may include the step of rotating crankshaft 20 of engine 10 at greater than about 5000 RPM, and in certain embodiments or under certain operating conditions at greater than about 6000 RPM, or even greater than about 6500 RPM. The method may further include burning a sufficient quantity of injected fuel in each of cylinders 14 to yield a brake mean effective pressure (BMEP) of at least about 200 pounds per square inch (PSI), and in certain embodiments or under certain operating conditions burning sufficient fuel to yield a BMEP of at least about 250 PSI, or even at least about 350 PSI.

Figure 3:
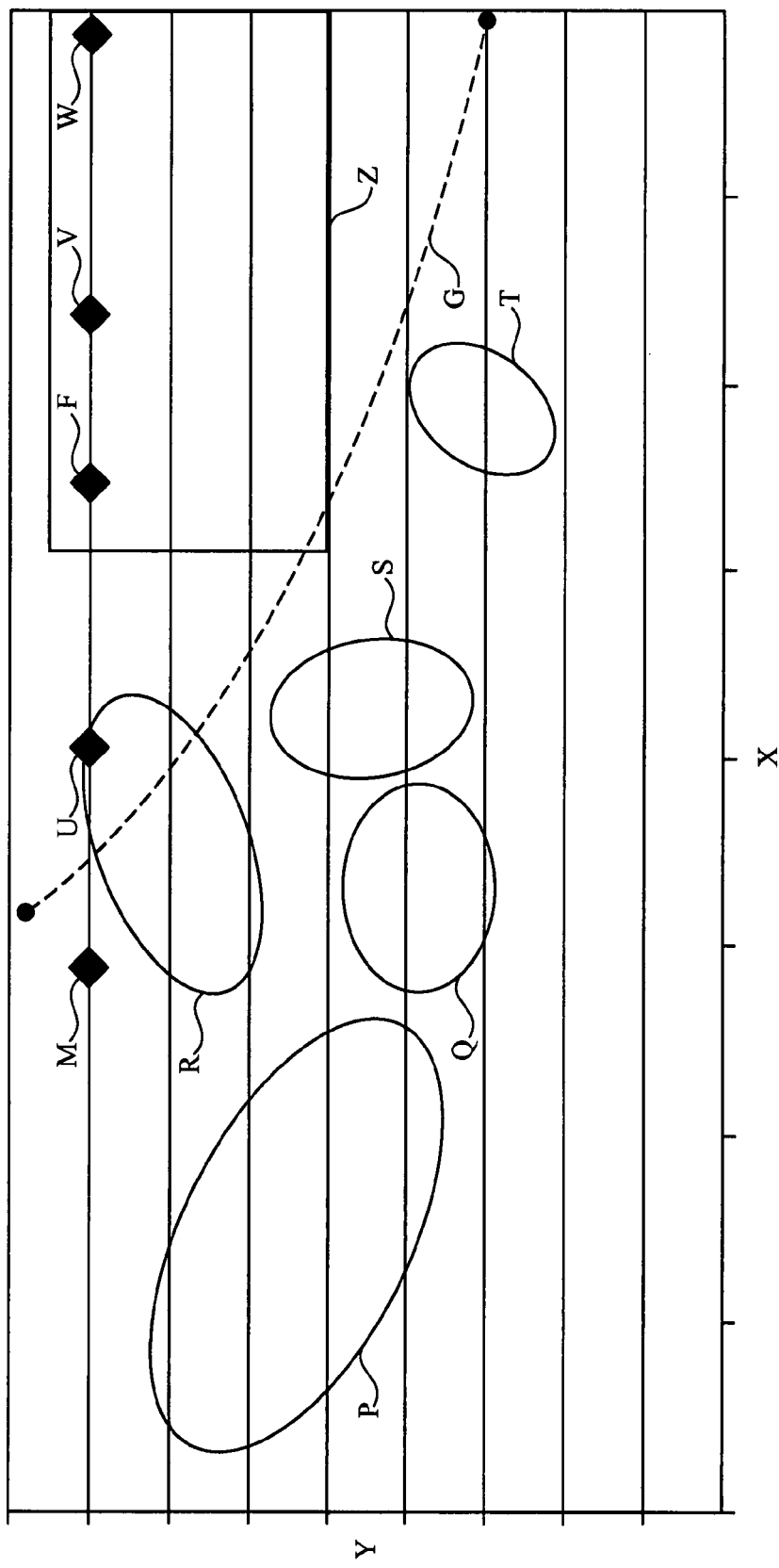
FIG. 3 is a graph illustrating plots of various compression ignition engine types relating BMEP and RPM.

Referring also to FIG. 3, three specific embodiments of engines according to the present disclosure W, V and F are represented therein, all located within an operating zone Z of engines according to the present disclosure, described hereinbelow. Certain specifications of engines W, V and F are set forth in the following table, in comparison to conventional engines M and U. All of engines W, V and F may include a plurality of injector orifices 22 having a diameter $D_2$ within the described predetermined ranges of about 0.05 millimeters to about 0.125 millimeters. As described herein, power density is the ratio of power to mass/volume. Those skilled in the art will appreciate that bore size of a particular engine will be related to engine mass/volume. Thus, in general terms, the 6 inch bore of engine M is scaled by a factor of 2 with regard to the 3 inch bore of engine F. With a scale factor of 2, power of engine M will be about 4 times that of engine F per cylinder, as power varies with the square of the scale factor. Mass and volume of engine M, however, will be about 8 times the mass and volume of engine F per cylinder, as mass and volume vary with the cube of the scale factor. Engine F will thus be more power dense than engine M.

|  | M | U | W | V | F |
|---|---|---|---|---|---|
| bore size | 6 in. | 4 in. | 2 in. | 2.7 in. | 3 in. |
| stroke distance | 6 in. | 4 in. | 2 in. | 2.5 in. | 3 in. |
| cylinders | 4 | 4 | 16 | 12 | 16 |
| bmep | 400 psi | 400 psi | 400 psi | 400 psi | 400 psi |
| rpm | 2667 | 4000 | 8000 | 5926 | 5334 |
| power | 914 hp | 406 hp | 406 hp | 514 hp | 914 hp |
| displacement | 678.6 in$^3$ | 201 in$^3$ | 100.5 in$^3$ | 171.8 in$^3$ | 339.3 in$^3$ |
| hp/in$^3$ | 1.35 | 2.02 | 4.04 | 2.99 | 2.69 |

As discussed above, engines F, V and W represent engines having power densities substantially greater than most conventional and high performance compression ignition engines. Typically, cylinder diameter and stroke distance for each of the engine cylinders will define a displacement of the internal combustion engine. Engines designed and operated according to the present disclosure may have power densities, expressed in terms of horsepower per liter of engine displacement, which are substantially greater than known designs. In FIG. 3, curve G represents an approximate boundary corresponding to engine power densities of 100 horsepower per liter of engine displacement. In other words, engines plotted on one side of curve G have power densities greater, and in the case of engines F, V, and W substantially greater, than 100 horsepower per liter. While much of the foregoing description focuses on relatively small, power dense engines, it should be appreciated that the present disclosure is not strictly limited to small bore engines. In one exemplary larger bore engine embodiment, plotted at a position similar to that of engine V in FIG. 3, power density of at least about 200 horsepower per liter is achievable, without producing excessive smoke or consuming excessive amounts of fuel. As used herein, horsepower may be understood as brake horsepower measured with a dynamometer per liter of displacement, i.e. total swept cylinder volume.

Figure 4:
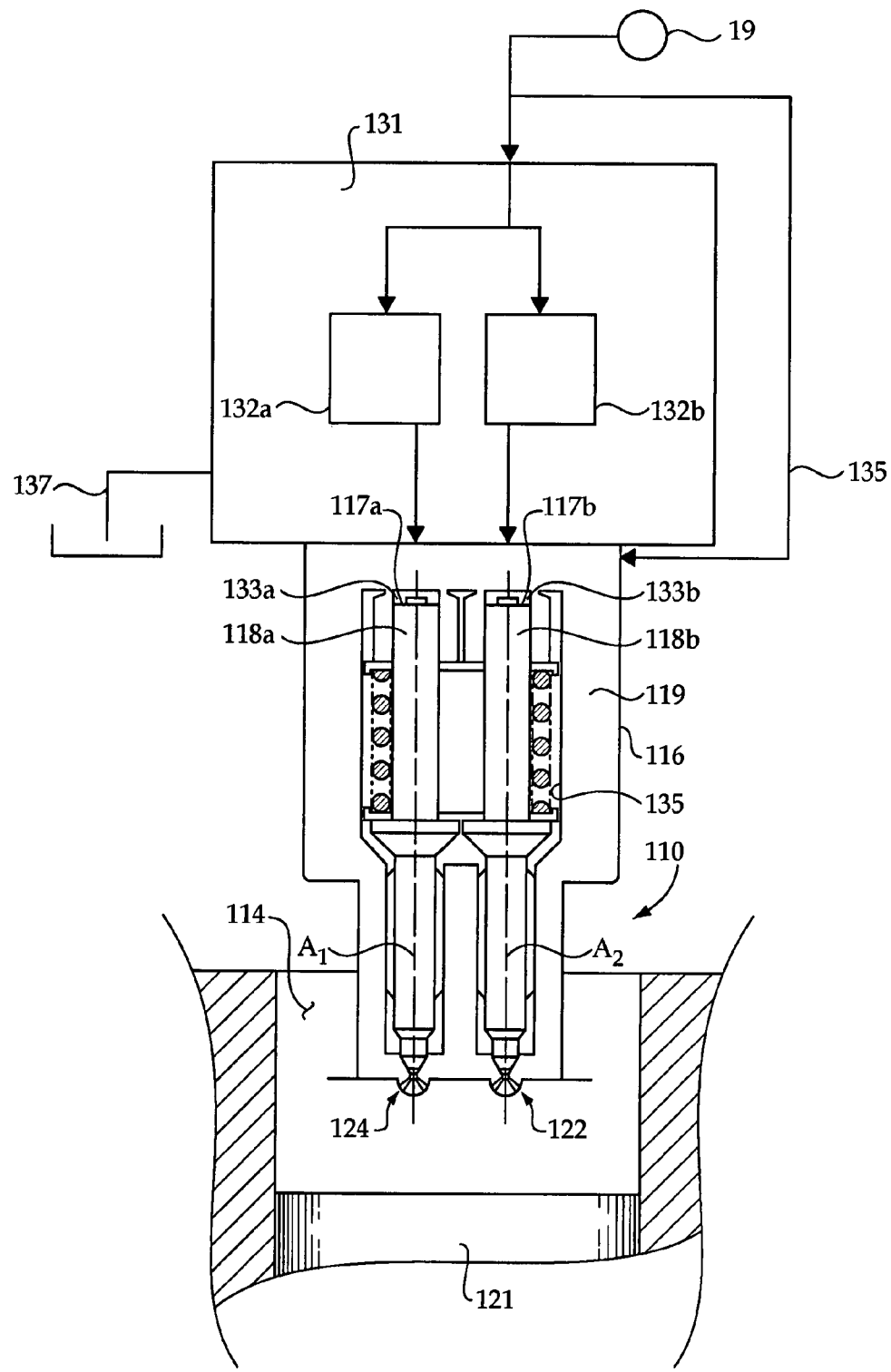
FIG. 4 is a schematic view of a portion of an engine system according to the present disclosure.

Turning to FIG. 4, there is shown schematically a portion of an engine system 110 according to one embodiment. Engine system 110 includes at least one cylinder 114 having a piston 121 reciprocable therein. Engine system 110 may also comprise a direct injected compression ignition engine, having certain similarities with the foregoing embodiments, but also differing in that rather than a single fuel injection orifice set, a fuel injection apparatus 116 is provided which includes a first set of outlet orifices 124 and a second set of outlet orifices 122, separate from the first set. Outlet orifices 124 and 122 may be disposed in an injector body 119 extending at least partially into cylinder 114. Fuel injection apparatus 116 may also be coupled with a common rail 19 and include a control valve assembly 131 configured to control fuel injection into cylinder 114 via apparatus 116. Control valve assembly 131 may include separate control valves 132a and 132b, each including an electrical actuator for example, configured to control fluid communication between common rail 19 and orifices 122 and 124 via at least one fuel supply passage 135. Passage 135 may be disposed at least partially within injector body 119.

Fuel injection apparatus 116 may comprise separate, side-by-side sets of outlet orifices, or it might alternatively include one of the various dual concentric check injectors which are known in the art. In either case, however, fuel injection apparatus 116 will typically be capable of separately controlling fuel spray out of the respective sets of outlet orifices 124 and 122. In one embodiment, separate, direct control of fuel spray may be achieved via a first needle check 118a and a second needle check 118b configured to separately control fuel spray out of orifices 124 and 122, respectively, needle checks 118a and 118b being operably coupled with control valves 132a and 132b, respectively. As used herein, the term "direct control" should be understood as referring to a system wherein the application of fluid pressure or some other closing force to a control surface of a valve member such as needle valve members 118a and 118b is used to control the closing and/or opening of the respective sets of orifices. In other words, direct control will utilize some means other than fluid pressure acting on opening hydraulic surfaces to enable fuel injection. To this end, control valve assembly 131 may comprise any of a variety of direct control systems.

In the embodiment shown in FIG. 4, hydraulic pressure is controllably applied to and relieved from a first pressure surface 117a and a second pressure surface 117b of needle checks 118a and 118b, the respective pressure surfaces being exposed to a fluid pressure in first and second needle control chambers 133a and 133b. Control valves 132a and 132b may be independently operable to permit different hydraulic pressures to be applied to pressure surfaces 117a and 117b. In a typical embodiment, one or both of control valves 132a and 132b will provide for supplying of rail pressure to control chambers 133a and 133b. Control valves 132a and 132b may be actuated to connect one or both of chambers 133a and 133b to a low pressure drain passage 137, relieving pressure in control chambers 133a and/or 133b and allowing rail pressure to lift the corresponding needle check 118a and/or 118b to permit the spraying of fuel from the associated orifices 124, 122.

It is further contemplated that in the FIG. 4 embodiment, at least one of the sets of outlet orifices 124 and 122 may comprise tiny outlet orifices having sizes and/or flow rates similar to outlet orifices 22, described with regard to the FIGS. 1 and 2 embodiments. The other set of orifices may be a conventional set, for example, including orifices having relatively larger sizes at or close to what would be considered suitable for a given engine in view of the present state of the art, for example between about 0.25 millimeters and about 0.30 millimeters. In still other embodiments, each of the sets of orifices 124 and 122 could include orifices having sizes and/or flow rates similar to orifices 22. In such instances, different numbers of orifices in the respective sets could be used to achieve different net flow rates, or flow areas.

Each of the sets of orifices 124 and 122 may be disposed in an annular pattern about an axis $A_1$ and an axis $A_2$, respectively, extending through the corresponding needle checks 118a and 118b. Orifices 124 and orifices 122 may also be disposed at different average spray angles relative to axes $A_1$ and $A_2$. In particular, orifices 122, the relatively smaller set in one embodiment, may be disposed at a relatively narrower average spray angle, whereas orifices 124 may be disposed at a relatively larger average spray angle. It should be appreciated that the embodiment of FIG. 4 is calculated to be applicable to both relatively small bore engines such as that described with regard to FIGS. 1 and 2, as well as other engines in relatively larger size ranges.

Figure 6:
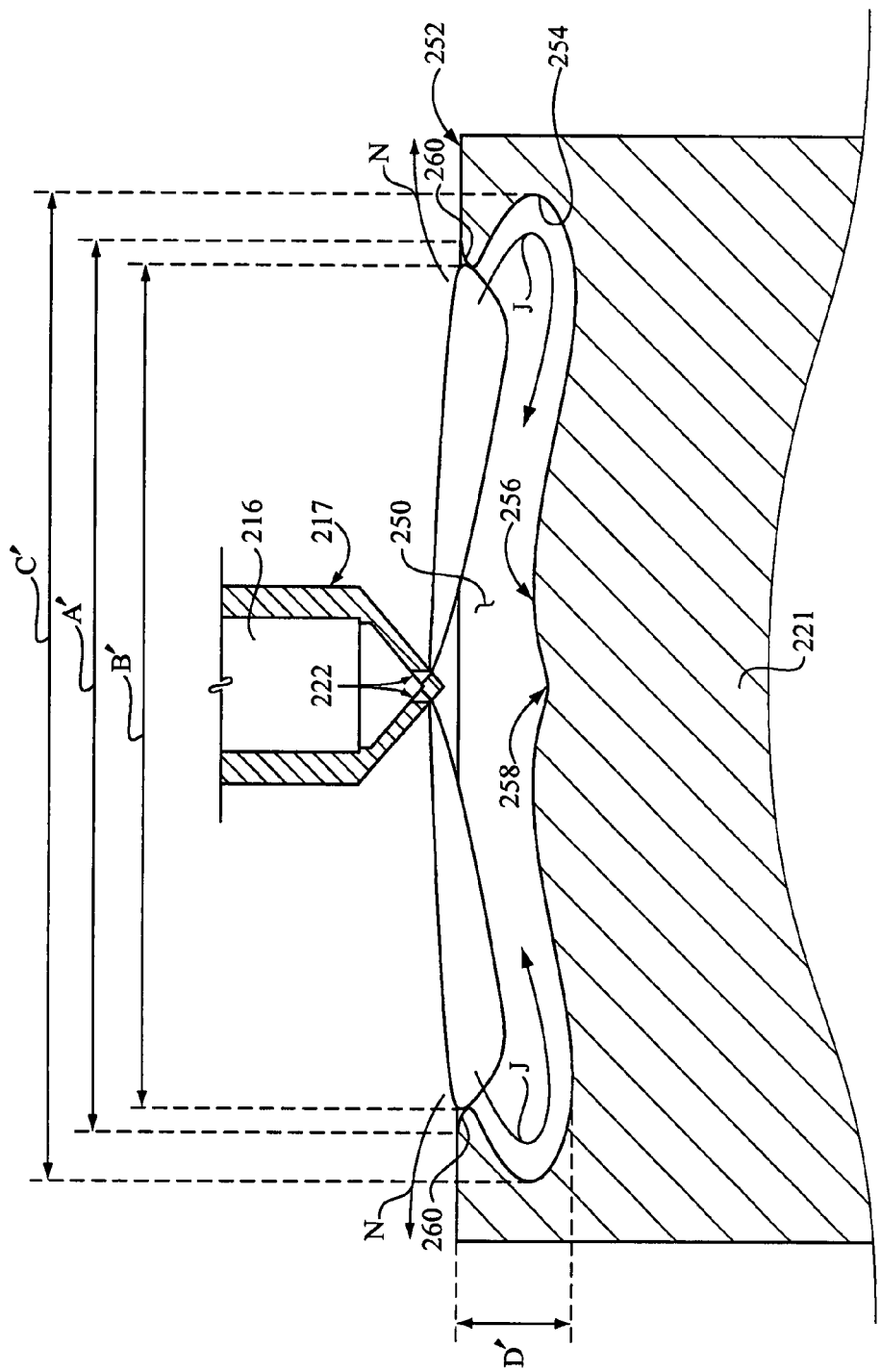
FIG. 6 is a sectioned diagrammatic side view of an engine piston and fuel injector according to the present disclosure.

Turning to FIG. 6, there is shown a piston 221 and a fuel injector 216 having a plurality of outlet orifices 222, for example outlet orifices having a converging taper toward an outer surface 217 of injector 216. While only a single injector is shown in FIG. 6, multiple injectors or an injector having dual nozzles, or otherwise having dual sets of outlet orifices, may be used. In one embodiment, orifices 222 may include at least 7 orifices, for example, in a radial pattern. Piston 221 may have a unique configuration for facilitating fuel-efficient combustion and low smoke operation, due at least in part to extremely fast mixing of fuel and air resulting from the unique design of piston 221. During a compression stroke, piston 221 may induce relatively high flow velocities from a region on top of piston 221 in the cylinder into a bowl 250 of piston 221. Piston 221 may further include a piston face 252 having an inwardly extending lip 260 which provides a transition between piston face 252 and piston bowl 250. An undercut portion 254 of piston 221 may in turn transition between lip 260 and an annular rise 256 toward a center of bowl 250. A recessed region 258 may lie at a center of piston bowl 250 which is surrounded by annular rise 256.

Piston bowl 250 may be relatively shallow, and highly re-entrant. Once fuel is injected, typically just prior to an expansion stroke, a reverse tumble motion of fuel and air resulting from the unique design of piston 221 can enhance turbulent mixing of fuel and air in the corresponding cylinder.

Fuel spray plumes from injector orifices 222 may extend outwardly towards lip 260. Once fuel is injected, the configuration of piston 221 will enable a reverse tumble motion such that fuel and air of spray plumes within bowl 250 will traverse a path approximately as shown with arrows J and N. In particular, fuel and air will flow generally from injector 216 toward lip 260, through undercut region 254 and curve back towards annular rise 256 and recessed region 258. A relatively smaller portion of a fuel and air mixture of the spray plumes will have a tendency to flow over lip 260, approximately as shown by arrows N, and accordingly into the squish volume of a cylinder associated with piston 221. The squish volume associated with piston 221 will generally be understood by those of skill in the art as the volume between face 252 and an engine housing when piston 221 is at a top dead center position. The unique configuration of piston 221 will enable flow of fuel and air into the squish volume and utilize air available therein for relatively more complete combustion than that attainable with other piston designs. The combustion k-factor, defined as the ratio between bowl volume and total volume at top dead center, will be optimized by minimizing crevice volumes, such as top ring land crevice, valve recess, pockets, and implementing special features, eg. cuffed liners Engines according to the present disclosure may have relatively low combustion k-factors as compared to conventional designs. This is achieved by maximizing bowl volume in certain instances to promote air utilization in combustion. In addition to utilizing air in the relatively small squish volume for combustion, the illustrated flow characteristics associated with piston 221 will tend to limit the amount of hot combustion gases coming into contact with relatively cool cylinder walls. This can enable heat rejection to be reduced, and further enhance the operating efficiency of an engine utilizing one or more pistons having the configuration shown in FIG. 6.

As alluded to above, piston 221 has a highly re-entrant shallow bowl configuration to enable the aforementioned flow characteristics for fuel and air mixtures during operation. In particular, piston 221 may have a reentrance ratio for bowl 250 of at least about 1.15 to 1. The reentrance ratio may be defined by the ratio between a maximum width of bowl 250, shown via line C' in FIG. 6, and a distance across a width of bowl 250 at lip 260, shown via line B' in FIG. 6. An aspect ratio associated with piston bowl 250 is the ratio between distances A' and B' shown in FIG. 6.

An engine constructed according to the teachings set forth herein can thus provide substantial improvements in power density over conventional engines, without sacrificing with regard to smoke emissions and/or efficiency. In particular, embodiments are contemplated wherein an engine such as engine 10 or engine 310 is configured to burn a quantity of injected fuel to yield at least about 150 horsepower per liter of engine displacement at a smoke output of less than about 0.4 grams smoke per horsepower-hour and a fuel consumption of less than about 250 grams fuel per kilowatt-hour output of the engine. One example of such an embodiment, might include the turbocharger configuration shown in FIG. 7, piston configuration shown in FIG. 6, and conventional size, converging tapered injector orifices and conventional cylinder diameters, as well as the described relatively short piston strokes and oversquare bore to stroke ratio. In one embodiment, a ratio of cylinder diameter to stroke distance may be in the range of about 1.3 to 1 to about 1.6 to 1, and may be less than about 80 millimeters in certain embodiments. To enable low smoke operation across a range of loads, such an example engine might also include injectors having dual sets of outlet orifices. In still further embodiments, an engine may be configured to burn a quantity of injected fuel once every fourth piston stroke to yield greater than about 200 horsepower per liter of engine displacement at a smoke output of less than about 0.1 grams smoke per horsepower-hour and a fuel consumption of less than about 250 grams fuel per kilowatt-hour output of the engine. Steady state smoke output of about 0.75 grams smoke per horsepower-hour may approximately correspond to an AVL smoke number for particulate emissions of 3.

It should be appreciated that while certain embodiments might include all or substantially all of the different unique elements disclosed therein, it is not necessary to include all of the design features or follow all of the operating concerns described. Thus, an engine such as engine 10 or 310 having the aforementioned power density, smoke output and fuel consumption characteristics might utilize the described tiny outlet orifices 22, and might or might not include multiple fuel injector nozzles or multiple sets of spray orifices for each of cylinders 14. Similarly, the multiple turbochargers shown in FIG. 7 might be dispensed with in certain embodiments. Further still, it is not necessary that all engines falling within the scope of the present disclosure include the unique piston bowl configuration shown in FIG. 6.

One specific example of a small bore engine according to the present disclosure might include an engine having cylinder bores between about 2.5 inches and about 3.5 inches in diameter and injector orifices between about 0.05 and about 0.125 millimeters in diameter. Such an engine would be configured to provide at least about 150 horsepower per liter of engine displacement, and a smoke output less than about 0.1 grams smoke per horsepower-hour and a fuel consumption of less than about 250 grams fuel per kilowatt-hour output of the engine. A small bore engine having the foregoing specifications might operate with boost pressure ratios between about 4 to 1 and about 7 to 1, and be operated at greater than about 5000 rpm. Such an engine might also have a short stoke, less than about 2.5 inches for example.

In other embodiments, however, relatively larger engines, such as those having bore sizes greater than three inches, and using one or more sets of conventional size outlet orifices, are envisioned. In one specific example of a relatively larger bore engine, cylinders greater than about 4.5 inches in diameter, and pistons having relatively short strokes, typically greater than about 2.5 inches, but less than the cylinder bore diameters, might be used. Such an engine might also include the dual nozzle outlet injectors described herein, having a first set of relatively smaller orifices and a second set of relatively larger orifices. Such an engine might be operated with boost pressure ratios of between about 5 to 1 and about 7 to 1, and have a smoke output of less than about 0.75 grams smoke per horsepower-hour at a fuel consumption of less than about 250 grams fuel per horsepower-hour. This example larger bore engine might be operated at greater than about 6,000 rpm to provide a power output of at least about 200 horsepower per liter of engine displacement.

INDUSTRIAL APPLICABILITY

During a typical four-stroke cycle, a main fuel injection will take place when each of pistons 21 is at or close to a top dead center position, every fourth piston stroke and in a conventional manner. Additionally, smaller pilot and/or post injections may accompany each main injection. In a compression ignition version of engine 10, compressed air and the injected, atomized fuel will ignite and combust to drive each of the respective pistons 21 and rotate crankshaft 30. Spark ignited designs will typically use a spark plug in a well known fashion to effect ignition.

Directly injecting fuel into cylinder 14 via orifices 22 having the predetermined diameter ranges described herein can allow ignition and better or more efficient combustion of a greater quantity and proportion of the injected fuel than in designs utilizing conventional fuel injection orifices. Several advantages result from this ability. First, the potential BMEP is higher. Higher BMEP in each cylinder means that an overall greater average pressure can act on each piston 21, providing more force to drive each piston 21 in its respective cylinder 14 and rotate crankshaft 30. The relatively smaller size of atomized fuel droplets from orifices 22 than from conventional sized orifices will reduce smoke and promote faster combustion as compared to the larger fuel droplets in a conventional design. The spray pattern from each injector orifice may have such a spread angle and internal fuel/air ratio that the mixing with the charge air may be much faster. Accordingly, this may allow both a greater absolute quantity of fuel to be burned, and may allow the fuel to be burned faster. It may also allow a greater proportion of the fuel injected to burn than in earlier designs. The higher injection pressure expected to be used in conjunction with the smaller orifices will help compensate for the lower flow rates of the smaller orifices and also will help fuel/air mixing without substantially affecting the depth of fuel penetration. In general, the combination of smaller orifices and higher pressure can thus allow better combustion before reaching wall-wetting and its associated degradation of combustion.

Secondly, given the inherently limited time within which to burn the injected fuel, the relatively smaller fuel droplets and a lower fuel/air ratio within the fuel spray plume available in engine 10 can allow fuel combustion to take place more quickly, allowing correspondingly greater engine RPMs. The combination of relatively greater BMEP and higher RPM allows engine 10 to operate with a higher power density than many heretofore available small cylinder bore engine designs.

Certain earlier small cylinder bore engines were able to approach the BMEP possible in engine 10, but not without shortcomings in other operating parameters. In order to burn sufficient fuel during each power stroke to achieve higher BMEP, many earlier engines typically operated at lower RPM than engine 10. In an attempt to increase the amount of fuel injected into each cylinder for every ignition stroke, and increase the BMEP, in some known operating schemes an excess of fuel is delivered to each cylinder. Where an excess of fuel is made available, however, the quantities of unburned hydrocarbons, soot and other pollutants may be so high as to make operation undesirable and inefficient in many environments. For instance, a visible "smoke signature" may be undesirable in certain military applications.

Similarly, certain earlier small bore engine designs are known that operate at an RPM approaching that of engine 10, but not without their own set of tradeoffs. In such relatively higher RPM engines, BMEP tends to be lower as smaller fuel injection quantities are injected to avoid excessive smoke and wasting of fuel. As a result, such engines may operate at relatively high RPM, but insufficient fuel can be burned during each power stroke to reach higher BMEP. In either previous design/scheme the available power of the engine is relatively lower than in similar engines of larger size, and the power density of such smaller engines tends to be lower than what it might in theory be given their relatively smaller size.

Engine horsepower is directly proportional to both RPM and BMEP, hence the capability of engine 10 to operate at both relatively high RPM and BMEP allows the total available power of engine 10 to be significantly greater than in previously known designs. Given the relatively small size of engine 10, its power density can be more commensurate with its actual size, and engine 10 can take fuller advantage of its small scale design than previous engines.

Engine 10 provides still further advantages over known designs which relate to the enhanced ease of ignition of the fuel injected through orifices 22. During cold starting conditions, many known compression ignition engines utilize external heat sources or the addition of combustible compounds such as ether to initially begin operating. In a compression ignition version of engine 10, the need for these and similar starting aids may be reduced over earlier designs or eliminated, as the smaller fuel droplets and lower fuel/air ratio in the fuel spray plume tend to make ignition occur more readily.

Further advantages of engine 10 relate to its ability to quiescently mix fuel and air in certain contemplated embodiments. This approach contrasts with most if not all earlier small cylinder bore designs wherein "swirl" mixing was necessary to mix the charge of fresh air with injected fuel. Swirl mixing requires a swirling of the charge of air delivered to the cylinder, primarily via appropriate geometry of the air intake system or turbochargers and cylinder ports. In contrast, quiescent mixing is commonly used in larger engine designs, wherein simply spraying the fuel into un-swirled air will provide sufficient mixing. Quiescent mixing may have the advantage of transferring less heat from the combustion space to the cylinder walls, head and piston during combustion and, accordingly, will allow more heat energy to be converted to shaft horsepower rather than transferred to the coolant through the cylinder walls, head and piston. In other embodiments, some swirl of the fuel and air mixture may be acceptable or even desirable, where a piston configuration similar to piston 221 of FIG. 6 is used, a small amount of swirl may assist in attaining very high rates of fuel and air mixing without transferring excessive heat to cylinder walls.

Still further advantages relate to the fuel economy of engine 10, as well as its relatively lower emissions. Burning more of the injected fuel allows the relative quantity of unburned hydrocarbons emitted from engine 10 to be reduced, improving its use of the fuel made available. In some contemplated embodiments, such as in certain aircraft, weight may be at a premium. Thus, in engine 10 the mass and size of the engine itself may are not only be relatively smaller, but the quantity of fuel that must be carried for a given travel range is reduced. In addition, the relatively higher proportion of fuel burned can reduce the smoke emitted during operation. There has been a perception that diesel engines often emit relatively large quantities of visible smoke. Aesthetics, environmental and in some instances tactical concerns, such as in military vehicles, can make minimizing visible smoke desirable or imperative. Engine 10 will typically be capable of substantially smokeless operation, for example, having a Bosch Smoke Number of 3 or less for transient operation and 2 or less for steady state operation. One means for quantifying the smoke content of engine exhaust is an exhaust opacity "smoke meter" such as the Bosch ESA 110—Computer Controlled Smoke Meter, available from Equipment Supplies Biddulph of Biddulph, Staffs, United Kingdom and other commercial suppliers.

Turning to FIG. 3, there is shown a plot of the operating zone of several different sets of conventional diesel engines in comparison to the operating zone Z of engine 10, and approximate locations of engines M and U of the foregoing table. The Y axis represents BMEP whereas the X axis represents RPM. In FIG. 1, set P represents a group of relatively heavy duty diesel engines having a BMEP between about 250 PSI and about 325 PSI. The engines of set P may include relatively smaller diesel engines, such as small scale power generators, mid-size engines such as might be found in trucks or off-highway work machines, and large diesel marine or power generation engines. The range of RPM in engines of set P tends to be between about 1000 RPM and about 2500 RPM. Set Q includes engines such as are known from common pick-up trucks, having a relatively higher RPM but lower BMEP than those of set P. Set R includes engines such as certain military vehicles having BMEP between about 350 PSI and about 400 PSI, and RPM between about 3000 and about 4000. Set S in turn includes such engines as may be used in many European passenger cars. Set T includes engines such as certain military motorcycle engines and engines proposed for unmanned aerial vehicles, with BMEP between about 150 PSI and 175 PSI and RPM between about 5500 and about 6000. As illustrated in FIG. 3, the operating zone of engine 10 includes higher BMEP and RPM in combination than any of the other, known engine types or groups. Pushing the engine RPM limits above that of known engines, particularly diesels, and elevating the attainable BMEP as described herein can thus provide a relatively small, lightweight and powerful engine. Point V of FIG. 3 represents one possible embodiment of the present disclosure, capable of a BMEP of about 400 PSI or greater, and an RPM between about 6000 and about 6500.

While much of the foregoing description focuses on the use of tiny fuel outlet orifices in a relatively small, power dense engine, the present disclosure is not thereby limited. In other embodiments, the use of tiny orifices may confer advantages in relatively larger engines, particularly direct injection diesel engines. In one specific embodiment, using both tiny outlet orifices and conventional outlet orifices similar to that shown in FIG. 4, the respective orifice sets can be used to inject fuel separately based on particular engine operating conditions such as speed and/or load. A sensor such as sensor 27 shown in FIG. 1 may also be used in engine 110 in determining the relative engine speed and/or load for purposes of selecting a desired injection strategy. Signals from sensor 27 may be input to an electronic controller similar to controller 15 shown in FIG. 1, and appropriate commands output to control valves 132a and 132b to inject fuel from the desired set of orifices based on the speed and/or load of engine 110.

During relatively lower speed and/or load conditions, it may be desirable to utilize the relatively smaller outlet orifices, for example, tiny orifices of set 122 in the FIG. 4 embodiment. Where engine 110 is operating in a lower portion of a speed and/or load range, injected liquid fuel has a relatively greater tendency to impinge upon the piston surfaces and/or walls of the engine's combustion chamber due to lower in-cylinder densities. Accordingly, the relatively lesser depth of penetration associated with fuel spray from orifices 122, having an average minimum cross sectional flow area between about 0.002 square millimeters and about 0.01 square millimeters, can enable operation with little or no wall wetting. Reduced or no wall wetting is associated with various advantages, as described above. At relatively higher speeds and/or loads, for instance in an upper half of a speed and/or load range, injection of relatively larger quantities of fuel, at relatively higher flow rates, for example, may be appropriate. In such instances, orifices 124, having conventional average size, may be used. Inputs from sensor 27 may be used to indicate speed and/or load range to determine that operation in one or more engine cycles using orifices 124 but not orifices 122 is appropriate, or that operation in one or more engine cycles using orifices 122 but not orifices 124 is appropriate.

It should further be appreciated that the present disclosure is applicable to different operating strategies relating to injection timing, size and injection rate shaping. In one example, the relatively smaller orifices 122 might advantageously be used for one or more pilot injections, or one or more post injections, whereas orifices 124 could be used for one or more relatively large, main injections. The same set of orifices might also be used for each of a plurality of injections in a given engine cycle. Orifices 122 might also be used for injections relatively early in an engine cycle in such operating regimes as are generally known as homogeneous charge compression ignition or HCCI. In addition to or instead of HCCI-style injections, pilot injections, post injections, etc., either of orifices 122 and 124 might be used to inject fuel for conventional diffusion burning. As piston 121 reciprocates, it may compress air to a compression ignition condition in cylinder 114, before, during and/or after which injection out of one of orifices 122 and 124 may be initiated to achieve a diffusion burn of fuel in combustion chamber 114.

Figure 5:
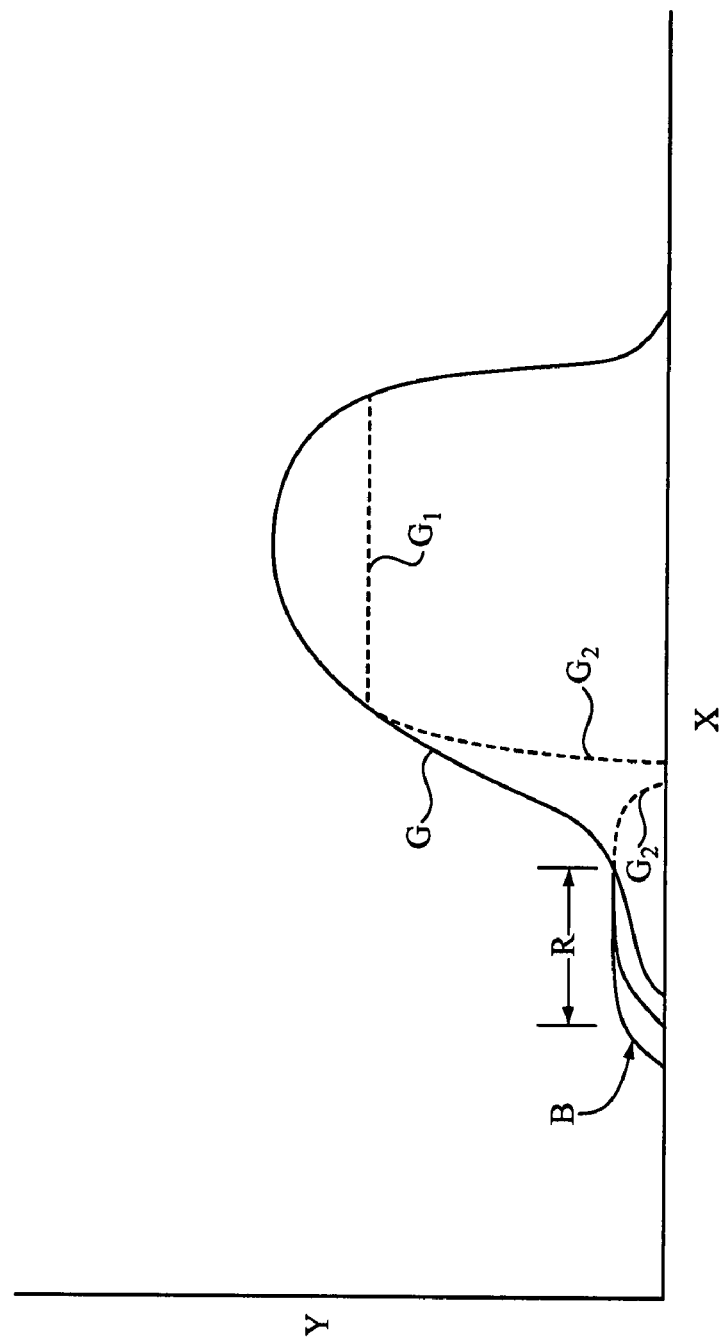
FIG. 5 is a graph illustrating fuel injection rate shaping according to the present disclosure.

Still another feature of the present disclosure relates to the relatively greater ability to control fuel injection rate, particularly at the start of injection and end of injection, through the use of the multiple, separately controlled sets of outlet orifices disclosed herein. Referring to FIG. 5, there is shown a graph wherein the y-axis represents injection rate and the x-axis represents time. In FIG. 5, "G" denotes a curve representing fuel injection rate over time, the profile of the curve G illustrating a fuel injection rate shape. It may be noted that curve G includes an initial portion "B" corresponding to an initial period of fuel injection known to those skilled in the art as a "boot." It has heretofore been difficult, if not impossible, to control the relative shape of the boot in a fuel injection rate curve. The use of a conventional single check generally results in the boot portion of a fuel injection curve being essentially an all or nothing phenomenon, given challenges in achieving the extremely precise control over the position of the outlet check that would be required to tailor the boot.

The use of dual sets of orifices 122 and 124 is contemplated to provide relatively more precise control over fuel injection rate in the boot portion of an injection rate curve than that available in conventional strategies. In other words, rather than the initial portion, i.e. the boot, of an injection rate curve being all or nothing, the present disclosure may allow the boot shape to be controlled cycle to cycle. One specific aspect of the boot which may be controlled is its relative length. In FIG. 5, a portion of the boot shown via range R represents an approximate plateau which typically exists between initial opening of fuel injection orifices and a relatively sharper increase in fuel injection rate subsequent to range R. Separate control over fuel injection orifices 124, 122, is contemplated to provide sufficiently precise control in some instances that the relative size of range R may be varied, as shown by the different available initial profiles of curve G in the boot portion B. The profile of curve G during the main portion of fuel injection can also be varied, as represented by broken line $G_1$ in FIG. 5. Further, rather than a boot contiguous with the rest of the injection curve, the boot might instead be a tiny injection followed by, but separate from, a main injection having a relatively shorter or even negligible boot portion, as illustrated via broken lines $G_2$ in FIG. 5. Use of the strategy described herein may also provide for improved injection rate control toward the end of fuel injection, as injection rate drops toward zero.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while many of the embodiments described herein are discussed in the context of both elevated BMEP and elevated RPM, those skilled in the art will appreciate that in certain applications it may be desirable to operate an engine with only one of RPM or BMEP significantly elevated as compared to conventional engines. It may be noted that set Z of FIG. 3 encompasses a relatively broad operating range of both BMEP and RPM. Small cylinder bore engines might be designed according to the present disclosure capable of operating at relatively high RPM of at least about 6000, but with BMEP no greater than about 200 PSI. Similarly, higher BMEP engines, but with relatively lower RPM may be desirable for other applications. The directly proportional relationship of both RPM and BMEP with power thus allows substantial flexibility in designing relatively high power density, small cylinder bore direct injected engines according to the present disclosure. Still further embodiments are contemplated wherein orifice size, shape, orientation, etc. varies, and can vary orifice to orifice on a given injector tip. This includes, for example, using a plurality of ultra-small orifices, a plurality of larger, conventional sized orifices, with individual geometric shape and orientation varying to create a simple or complex array of orifices to provide the best overall spray pattern. Thus, there need be no particular sizing or any particular number or arrangement of ultra-small hole orifices so long as a sufficient number are provided to impart the desired operating characteristics, as described herein. Other aspects, features and advantages will be apparent upon an examination of the attached drawing Figures and appended claims.

What is claimed is:

1. An internal combustion engine comprising:
   an engine housing including a plurality of cylinders each having a piston positioned at least partially therein and each piston having a piston bowl with a reentrancy ratio of at least about 1.15:1 and an aspect ratio of at least about 3.5:1 and is movable a stroke distance to increase a pressure of the corresponding cylinder to a pressure sufficient for compression ignition of fuel, wherein a diameter of said cylinders and a length of said stroke distance defines a displacement of said internal combustion engine;
   a crankshaft coupled with each of said pistons and rotatable via combustion of fuel in each of said cylinders; and
   a plurality of fuel injectors having fixed positions relative to said engine housing and including at least one fuel injector extending into each one of said cylinders and configured to inject a liquid fuel therein at an injection pressure via a plurality of outlet orifices;
   wherein said engine is configured to burn a quantity of injected fuel in each of said cylinders to yield at least about 150 horsepower per liter of engine displacement at a smoke output of less than about 0.4 grams smoke per horsepower-hour and a fuel consumption of less than about 250 grams fuel per kilowatt-hour output of said engine.

2. The internal combustion engine of claim 1 wherein said pistons each have a stroke distance less than about 80 millimeters.

3. The internal combustion engine of claim 2 wherein a ratio of the diameter of said cylinders to said stroke distance is in a range of about 1.3:1 to about 1.6:1.

4. The internal combustion engine of claim 2 wherein said pistons are configured to rotate said crankshaft at a speed of at least about 5000 revolutions per minute, said internal combustion engine being configured to burn a quantity of injected fuel in each of said cylinders to yield a brake mean effective pressure of at least about 200 pounds per square inch when rotating said crankshaft at a speed of at least about 5000 revolutions per minute.

5. The internal combustion engine of claim 1 further comprising a fuel system that includes a common rail fluidly connected with each of said fuel injectors, wherein the at least one fuel injector extending into each of said cylinders includes a plurality of sets of outlet orifices, each set including at least seven outlet orifices.

6. The internal combustion engine of claim 5 wherein at least a portion of said outlet orifices have a converging taper.

7. The internal combustion engine of claim 5 wherein the at least one fuel injector extending into each of said cylinders includes a first nozzle body wherein a first set of said outlet orifices is disposed and a second nozzle body wherein a second set of said outlet orifices is disposed, and wherein an average minimum cross-sectional flow area of the first set is greater than an average minimum cross-sectional flow area of the second set.

8. The internal combustion engine of claim 1 wherein said engine is configured to burn a quantity of liquid fuel injected into each of said cylinders once every fourth piston stroke to yield between about 175 horsepower and about 200 horsepower per liter of engine displacement at a smoke output of less than about 0.1 grams smoke per horsepower-hour.

9. The internal combustion engine of claim 8 further comprising an intake manifold and a plurality of turbochargers configured to supply compressed air to said intake manifold at a boost pressure ratio of between about 4:1 and about 7:1 and a common rail fuel system connecting with each of said injectors and configured to supply said fuel to yield an air to fuel ratio in said engine of at least about 25:1.

10. The internal combustion engine of claim 9 wherein said plurality of turbochargers includes a first turbocharger and a second turbocharger positioned in parallel, and a high-pressure turbocharger positioned in series with said first and second turbochargers.

11. The engine of claim 1 wherein:
each of said cylinders has a diameter between about 2.5 inches and about 3.5 inches;
each of said pistons is movable a stroke distance within the corresponding cylinder which is less than about 2.5 inches, said pistons being configured to rotate said crankshaft at a speed greater than about 5000 RPM;
each of said fuel injectors has a plurality of outlet orifices having an average minimum cross sectional flow area between about 0.002 square millimeters and about 0.01 square millimeters;
said engine further comprising at least one turbocharger configured to supply air to said engine at a boost pressure ratio of between about 4:1 and about 7:1, wherein said engine is configured to burn a quantity of injected fuel to yield at least about 150 horsepower per liter of engine displacement at a smoke output of less than about 0.1 grams smoke per horsepower-hour and fuel consumption of less than about 250 grams fuel per kilowatt-hour output of said engine.

12. The engine of claim 1 wherein:
each of said cylinders has a diameter greater than about 4.5 inches;
each of said pistons is movable a stroke distance within the corresponding cylinder that is less than a diameter of the corresponding cylinder, said pistons being configured to rotate said crankshaft at a speed greater than about 6000 RPM;
the at least one injector extending into each of said cylinders includes a first set of outlet orifices and a second set of outlet orifices, wherein the second set has an average minimum cross sectional flow area less than that of the first set;
said engine further comprising at least one turbocharger configured to supply air to said engine at a boost pressure ratio of between about 5:1 and about 7:1, and wherein said engine is configured to burn a quantity of injected fuel to yield at least about 200 horsepower per liter of engine displacement at a smoke output of less than about 0.75 grams smoke per horsepower-hour and a fuel consumption of less than about 250 grams fuel per kilowatt-hour output of said engine.

13. A method of operating an internal combustion engine comprising the steps of:
rotating an engine crankshaft via a plurality of pistons each reciprocable a stroke distance within an engine cylinder and configured to increase a pressure within the cylinders to a pressure sufficient for compression ignition of fuel;
supplying pressurized air to the engine cylinders via at least one turbocharger at a boost pressure ratio of between about 4:1 and about 7:1;
injecting a liquid fuel into each of the cylinders via fuel injectors extending into each of the cylinders and having a plurality of outlet orifices; and
burning fuel injected into each of the cylinders to yield at least about 150 horsepower per liter of engine displacement at a smoke output of less than about 0.4 grams smoke per horsepower-hour and a fuel consumption of less than about 250 grams fuel per kilowatt-hour output of the engine.

14. The method of claim 13 wherein the step of rotating an engine crankshaft comprises rotating the engine crankshaft at a speed of at least about 5000 revolutions per minute, and wherein the step of burning fuel further comprises burning fuel to yield a brake mean effective pressure of at least about 200 pounds per square inch in each of the cylinders.

15. The method of claim 14 wherein the step of injecting fuel comprises injecting fuel at a pressure of at least about 150 MPa via at least seven outlet orifices in each of the fuel injectors.

16. The method of claim 15 wherein the rotating step comprises rotating the engine crankshaft at a speed greater than about 6000 revolutions per minute, and wherein the burning step further comprises burning fuel injected once every fourth piston stroke to yield a brake mean effective pressure of at least about 300 pounds per square inch in each of the cylinders.

17. The method of claim 16 wherein the burning step further comprises burning fuel to yield between about 175 horsepower per liter of engine displacement and about 200 horsepower per liter of engine displacement at a smoke output of less than about 0.1 grams smoke per horsepower-hour.

* * * * *